United States Patent
Volcani et al.

(10) Patent No.: US 7,603,268 B2
(45) Date of Patent: *Oct. 13, 2009

(54) SYSTEM AND METHOD FOR DETERMINING AND CONTROLLING THE IMPACT OF TEXT

(76) Inventors: Yanon Volcani, 305 Bird Rock Ave., La Jolla, CA (US) 92037; David B. Fogel, 4849 Algonquin Ct., San Diego, CA (US) 92130

( * ) Notice: Subject to any disclaimer, the term of this patent is extended or adjusted under 35 U.S.C. 154(b) by 702 days.

This patent is subject to a terminal disclaimer.

(21) Appl. No.: 10/639,143

(22) Filed: Aug. 11, 2003

(65) Prior Publication Data

US 2004/0034630 A1 Feb. 19, 2004

Related U.S. Application Data

(63) Continuation-in-part of application No. 10/376,680, filed on Feb. 28, 2003, which is a continuation-in-part of application No. PCT/US00/34696, filed on Dec. 20, 2000.

(60) Provisional application No. 60/171,315, filed on Dec. 21, 1999.

(51) Int. Cl.
G06F 17/28 (2006.01)

(52) U.S. Cl. .................................. 704/10; 704/9; 704/7
(58) Field of Classification Search ............... 704/1–10, 704/257, 251, 255, 270; 707/100, 55, 1–10
See application file for complete search history.

(56) References Cited

U.S. PATENT DOCUMENTS

| 6,332,143 | B1 * | 12/2001 | Chase | 707/100 |
| 6,389,415 | B1 * | 5/2002 | Chase | 707/5 |
| 6,721,734 | B1 * | 4/2004 | Subasic et al. | 707/5 |

* cited by examiner

*Primary Examiner*—Huyen X. Vo
(74) *Attorney, Agent, or Firm*—Sheppard Mullin Richter & Hampton; David E. Heisey

(57) ABSTRACT

A computer program that indicates lexical impact of various words and phrases in a text, measures the overall lexical impact of the text, and suggests alternatives for various words and phrases of the text. The computer program may include a ranked thesaurus for listing alternative words and phrases (e.g., synonyms, antonyms, related), along with an indication of their relative lexical impacts. The thesaurus may alternatively rank words and phrases according to other ranking systems.

24 Claims, 14 Drawing Sheets

| VOCABULARY WORD | HAPPINESS | DEPRESSION | HOSTILITY | READING LEVEL | THESAURUS GROUPINGS |
|---|---|---|---|---|---|
| Advantages | +3 | -2 | -2 | 3 | (2, syn) |
| Benefits | +3 | -2 | -2 | 4 | (2, syn) |
| Careful | 0 | 0 | -3 | 2 | N/a |
| Consideration | +3 | 0 | -2 | 4 | (4, syn) |
| Cries for | -4 | +4 | +2 | 9 | (3, ant) |
| Crimes | -3 | +2 | +3 | 3 | N/a |
| Criteria | 0 | 0 | 0 | 7 | (2, rel) |
| Drawbacks | -3 | +4 | +1 | 7 | (2, ant) |
| Earns | +2 | -1 | -1 | 3 | (3, syn) |
| Hate | -4 | +3 | +5 | 1 | (1, ant) |
| Like | +3 | -1 | -2 | 1 | (1, rel) |
| Love | +5 | 0 | -5 | 1 | (1, syn) |
| Merits | +3 | -1 | -2 | 8 | (2, syn); (3, syn) |
| Qualities | +1 | -1 | -1 | 6 | (2, syn) |
| Receives | 0 | 0 | 0 | 4 | (3, rel) |
| Screams for | -2 | +1 | +4 | 5 | (3, ant) |
| Suggests | 0 | 0 | 0 | 3 | (3, syn) |
| Thought | 0 | 0 | 0 | 2 | (4, syn) |

FIG. 4

| THESAURUS GROUP NO. | SYNONYMS | ANTONYMS | "REL." |
|---|---|---|---|
| 1 | Love | Hate | Like |
| 2 | Advantages, Benefits, Merits, Qualities | Drawbacks | Criteria |
| 3 | Earns, Merits, Suggests | Cries for, Screams for | Receives |
| 4 | Consideration, Thought | N/a | N/a |

FIG. 5

| PHRASE | HAPPINESS | DEPRESSION | HOSTILITY | READING LEVEL | THESAURUS GROUPING |
|---|---|---|---|---|---|
| Once in a blue moon | -1 | +2 | +1 | 5 | (1, ant) |
| Clean as a whistle | +2 | -1 | -1 | 5 | (2, syn) |
| Clear as day | +3 | -3 | -3 | 4 | (3, rel) |

FIG. 7

| THESAURUS GROUP NO. | SYNONYMS | ANTONYMS | "Rel." |
|---|---|---|---|
| 1 | Frequently, Often | Infrequently, Once in a blue moon, Seldom | Commonly |
| 2 | Spotless, Clean as a whistle | Dirty, Unclean | Sterile |
| 3 | Obvious, Apparent, Lucid | Unclear, Vague | Clear as day |

FIG. 8

THESAURUS DIALOGUE WINDOW

SELECTED WORD/PHRASE: CLEAN AS A WHISTLE
CHOOSE RANKING SPECTRUM: HAPPINESS, DEPRESSION, HOSTILITY), READING LEVEL?

SELECTED RANKING SPECTRUM: HAPPINESS

RELATED WORD SET #1: CLEAN AS A WHISTLE(+2)

SYN: SPOTLESS(+3)
ANT: DIRTY(-3); UNCLEAN(-2)
REL: STERILE(-1)

CLICK ON ANY REPLACEMENT WORD TO REPLACE "CLEAN AS A WHISTLE" IN THE TEXT

[EXIT]

FIG. 9

EXECUTING AUTOMATIC REPLACE FOR
MINIMUM READING LEVEL.........

WHICH IS WHY THE
HATE [ RL 1 ] CRIMES [ RL 3 ] BILL
(ADVANTAGES / EARNS / SUGGESTS) [ RL 3 ]
CAREFUL [ RL 2 ] THOUGHT [ RL 2 ]
LIKE [ RL 1 ] ALL LAWS DO.........

FIG. 11

SYSTEM AND METHOD FOR DETERMINING AND CONTROLLING THE IMPACT OF TEXT

This application is a continuation-in-part application claiming priority from co-pending U.S. patent application Ser. No. 10/376,680 filed on Feb. 28, 2003, which is a continuation-in-part application claiming priority from co-pending International Application No. PCT/US00/34696 (Publication No. WO 01/46821 A1) having an international filing date of Dec. 20, 2000. International Application No. PCT/US00/34696 claims priority to U.S. Provisional Patent Application Ser. No. 60/171,315, filed Dec. 21, 1999.

FIELD OF THE INVENTION

The present invention is directed to a system and method for determining the emotional impact of text, and more particularly to a computer program for indicating the emotional quality of a text.

BACKGROUND OF THE INVENTION

It is conventionally recognized that the words we combine to form text can have an emotional impact on the reader. Such impact arises from two distinct sources of effect related to the text. First, there is contextual emotional impact. Contextual emotional impact is the emotional impact that text can be expected to have on a reader due to the meaning of the words as a whole, as opposed to the literal meaning of individual words or phrases. For example, the words "I kissed your spouse on the lips" may cause hostility in a reader. This is not because any of the words in this text ("I," "kissed," "spouse," etc.), viewed in isolation, is an angry word. Rather, the reader will likely perceive that inappropriate behavior has taken place, and become angry because of this.

Most people have a considerable appreciation of contextual emotional impact, and evidence this understanding by using techniques of communication that rely on manipulation of contextual emotional impact. For example, flattery, fighting words and eulogies are types of communication where the meaning of the words used are intended to invoke various kinds of specific emotional responses in the listener (or reader) because of what the words mean in context. In this way, contextual meaning would be what one intends to literally communicate to another person through the combination of words used. While obviously of great importance in communication, contextual impact is not the main subject of this document.

A subtler type of emotional impact is called lexical emotional impact. This is an emotional impact that can be expected in the reader due to the underlying associative meaning of specific words and phrases. For example, consider the following statement: "Murder is illegal and immoral." This statement is uncontroversial, and therefore should have little contextual emotional impact. Nevertheless, because "murder" and "immoral" are words that have a strong valence within the affective (that is, emotional) category of hostility, this statement might have a significant impact from a lexical perspective. Specifically the reader can be expected to become (perhaps unconsciously) subjectively evoked upon reading the words "murder" and "immoral" by the compound incidences of high-valence hostile words, despite the relatively innocuous context. "Subjectively evoked" here means evoked in a manner characteristic of the reader's unique response to the elicited category—in this case, hostility (which typically would evoke hostility and/or a sense of threat). Hence, from a lexical perspective, the parts are greater than the whole.

Lexical emotional impact has been a subject of serious psychological inquiry, and analysis based on lexical emotional impact is performed and applied, for instance, by authors of advertising text and authors of political speeches. According to this background art, the lexical emotional impact is determined for a large set of vocabulary words. This may be determined by informal observation of emotional impact of the words, or more preferably by scientific, psychological study. An author then memorizes the lexical emotional impact of the words, and chooses words of the text to have the desired lexical emotional impact. The author may rewrite and revise the text (which is especially easy to do with a computerized word processor) in order to optimize the desired lexical impact based on the vocabulary list.

The desired lexical emotional impact varies depending on the objectives and intended audience of the text. For example, the text may attempt to evoke a particular emotional reaction, such as happiness. Alternatively, it may be desired to write a text devoid of lexical emotional impact, or filled with lots of conflicting lexical emotional impacts. As awareness of lexical emotional impact increases, it is possible that more sophisticated objectives, with respect to lexical emotional impact, will be developed.

SUMMARY OF THE INVENTION

There are a couple of fundamental shortcomings in the above method of writing text. First, the lexical impact, as understood by the author, may not be correct. In other words, the author may be basing the lexical emotional impact analysis on personal proclivities and experience. This may lead to inaccurate determinations of lexical impact because the author's proclivities and experiences form, at best, an extremely small sample of empirical observation. Second, the author generally has to memorize the impacts for a great many words, so that the author has sufficient vocabulary to express a desired thought using words of the correct lexical impact. Alternatively, the author may avoid memorization by frequently consulting and re-consulting the vocabulary list, but this is extremely time-consuming.

Finally, there is a lack of precision with respect to small variations in lexical impact. For example, even if an author of, say, advertising copy has a list of happiness words, chances are the list will not numerically rate all of the words (this would simply be too much for the author to memorize or keep track of). So, the ad copy author can classify words as on-the-happiness-list or as not-on-the-happiness-list, but there is no realistic way for the ad copy author to know how all the words on the happiness list rank relative to each other. Even if the happiness list quantified the impact of the words on the happiness list, it would be difficult or impossible for the author to commit these numbers to memory.

The present invention applies the capabilities of the computer to the problem of determining and optimizing emotional lexical impact. More specifically, according to the present invention, a large set of words and their relative lexical impacts across defined categories are stored in a vocabulary database. Optionally, the vocabulary database further includes a large set of phrases along with their relative lexical impacts. Importantly, the relative lexical impacts are determined without resort to the denotative meanings of the words.

When text is entered into a word processor, a computer program according to the present invention can mark at least some of the words to indicate their lexical emotional impact on the reader. For example, hostile words, as determined by the computer program and its database, may appear in red. Better still, the degree of hostile lexical impact may be indicated by the shade of red.

As a further feature of the present invention, a computerized thesaurus can be used to suggest alternatives for various words of the text, with the suggested alternatives being ranked in terms of relative lexical impact. With all the alternatives being ranked, it becomes easy for an author to choose, for example, a slightly more hostile word, a much more hostile word or a less hostile word. The present invention does not so much help an author determine what kind of lexical emotional impact to seek as it does help an author achieve any desired lexical impact in a more precise way.

While the ranked thesaurus preferably ranks words according to lexical impact, other rankings systems (or ranking spectrums) may also be used. For example, words of the thesaurus may be ranked based on reading level (e.g., eighth-grade reading level, college reading level, and so on). The variety of possible, helpful ranking spectrums is quite wide. As a further example, words may be ranked in the thesaurus based on how often they occur in the collected works of Shakespeare.

At least some embodiments of the present invention can solve these problems and associated opportunities for improvement.

At least some embodiments of the present invention may exhibit one or more of the following objects, advantages, and benefits:

(1) an author can achieve better control of the emotional impact of text to achieve desired rhetorical or other objectives;
(2) written communication can be improved;
(3) offense to readers, inflammation of readers and other extraneous or unintended emotional responses in readers can be minimized;
(4) authors do not need to commit lexical impact of various word to memory, thereby making writing easier;
(5) alternatives to words and phrases used in a text can be provided in order to relieve the author of the task of thinking of alternatives to a word or phrase that does not have the optimal lexical impact;
(6) alternative words and phrases can be easily and precisely compared with respect to lexical impact, or other ranking spectrums; and
(7) the lexical impact, over the course of a text, can be more easily and precisely measured with statistics.

One aspect of the present invention involves a computer program including a vocabulary database comprising machine readable data corresponding to a plurality of vocabulary words and a lexical impact value respectively corresponding to each vocabulary word, comparison instructions comprising machine readable instructions for comparing a plurality of text words of a piece of text to the vocabulary database to determine a lexical impact value for each text word that corresponds to a vocabulary word and output instructions comprising machine readable instructions for outputting the lexical impact value of the text words that correspond to vocabulary words as output data, wherein the lexical impact value for each text word is determined without resort to a denotative meaning of the text word.

Another aspect of the present invention involves a computer program including a vocabulary database comprising machine readable data corresponding to a plurality of vocabulary words and a lexical impact value respectively corresponding to each vocabulary word, comparison instructions comprising machine readable instructions for comparing a plurality of text words of a piece of text to the vocabulary database to determine a lexical impact value for each text word that corresponds to a vocabulary word, output instructions comprising machine readable instructions for outputting the lexical impact value of the text words that correspond to vocabulary words as output data and statistical instructions comprising machine readable instructions for compiling at least one statistical measurement based on the lexical impact values of the text words as determined by the comparison instructions, wherein the at least one statistical measurement is an average lexical impact value.

A further aspect of the present invention involves a computer program including a vocabulary database comprising machine readable data corresponding to a plurality of vocabulary words and a lexical impact value respectively corresponding to each vocabulary word, comparison instructions comprising machine readable instructions for comparing a plurality of text words of a piece of text to the vocabulary database to determine a lexical impact value for each text word that corresponds to a vocabulary word, output instructions comprising machine readable instructions for outputting the lexical impact value of the text words that correspond to vocabulary words as output data and display instructions comprising machine readable instructions for receiving the output data and for generating a visual display, perceivable by the author, indicative of the lexical impact values of the text words.

An additional aspect of the present invention involves a computer program including a vocabulary database comprising machine readable data corresponding to a plurality of vocabulary words and a lexical impact value respectively corresponding to each vocabulary word, comparison instructions comprising machine readable instructions for comparing a plurality of text words of a piece of text to the vocabulary database to determine a lexical impact value for each text word that corresponds to a vocabulary word, output instructions comprising machine readable instructions for outputting the lexical impact value of the text words that correspond to vocabulary words as output data and display instructions comprising machine readable instructions for receiving the output data and for generating a visual display, perceivable by the author, indicative of the lexical impact values of the text words, wherein the visual display comprises a portion of the text along with a visual indication of lexical impact value of at least some text words, with the visual indication of lexical impact value being disposed in proximity to its corresponding text word, wherein the visual indication of lexical impact values is accomplished by variation in the color of the text words or by displaying numbers indicating lexical impact values respectively within the vicinity of corresponding text words.

Yet another aspect of the present invention involves a computer program including a thesaurus database comprising machine readable data corresponding to thesaurus groupings and rankings for each of each thesaurus grouping, with respect to a ranking spectrum, input instructions comprising machine readable instructions for receiving a requested text portion, retrieval instructions comprising machine readable instructions for retrieving a thesaurus grouping corresponding to the requested text portion and output instructions comprising machine readable instructions for outputting the thesaurus grouping and its respective corresponding rankings.

A further aspect of the present invention involves a computer program including a thesaurus database comprising machine readable data corresponding to thesaurus groupings and rankings for each of each thesaurus grouping, with respect to a ranking spectrum, input instructions comprising machine readable instructions for receiving a requested text portion, retrieval instructions comprising machine readable instructions for retrieving a thesaurus grouping corresponding to the requested text portion and output instructions comprising machine readable instructions for outputting the thesaurus grouping and its respective corresponding rankings, wherein the requested text portion comprises a phrase and/or a cliche including a plurality of words.

An additional aspect of the present invention involves a computer program including a thesaurus database comprising machine readable data corresponding to thesaurus groupings and rankings for each of each thesaurus grouping, with respect to a ranking spectrum, input instructions comprising machine readable instructions for receiving a requested text portion, retrieval instructions comprising machine readable instructions for retrieving a thesaurus grouping corresponding to the requested text portion, output instructions comprising machine readable instructions for outputting the thesaurus grouping and its respective corresponding rankings and replacement instructions for selecting a replacement text portion for the requested text portion, wherein the replacement text portion comprises a single word or a plurality of words.

Another aspect of the present invention involves a computer program including a thesaurus database comprising machine readable data corresponding to thesaurus groupings and rankings for each thesaurus grouping, with respect to a ranking spectrum, input instructions comprising machine readable instructions for receiving a requested text portion, retrieval instructions comprising machine readable instructions for retrieving a thesaurus grouping corresponding to the requested text portion and output instructions comprising machine readable instructions for outputting the thesaurus grouping and its respective corresponding rankings, wherein the ranking spectrum corresponds to lexical impact and/or reading level, wherein the words of the thesaurus groupings of the thesaurus database comprise synonyms, antonyms, and related words.

An additional aspect of the present invention involves a computer program including a thesaurus database comprising machine readable data corresponding to thesaurus groupings, input instructions comprising machine readable instructions for receiving a requested text portion, retrieval instructions comprising machine readable instructions for retrieving a thesaurus grouping corresponding to the requested text portion and output instructions comprising machine readable instructions for outputting the thesaurus grouping, wherein the words of the thesaurus groupings of the thesaurus database comprise synonyms, antonyms, and related words.

Further applicability of the present invention will become apparent from a review of the detailed description and accompanying drawings. It should be understood that the description and examples, while indicating preferred embodiments of the present invention, are not intended to limit the scope of the invention, and various changes and modifications within the spirit and scope of the invention will become apparent to those skilled in the art.

BRIEF DESCRIPTION OF THE DRAWINGS

The present invention will become more fully understood from the detailed description given below, together with the accompanying drawings, which are given by way of illustration only, and are not to be construed as limiting the scope of the present invention. In the drawings:

FIG. 4 is a table showing the content of a vocabulary database according to the present invention;

FIG. 5 is a table showing the content of a thesaurus database according to the present invention;

FIG. 7 is a table showing the content of a phrase database according to the present invention;

FIG. 8 is a table showing the content of a thesaurus database according to the present invention;

FIG. 9 is an interactive screen display generated when using the thesaurus features of the present invention;

FIG. 11 is an exemplary screen display showing text that has been revised pursuant to automatic word replace processing.

DETAILED DESCRIPTION OF THE PREFERRED EMBODIMENTS

Figure 1:
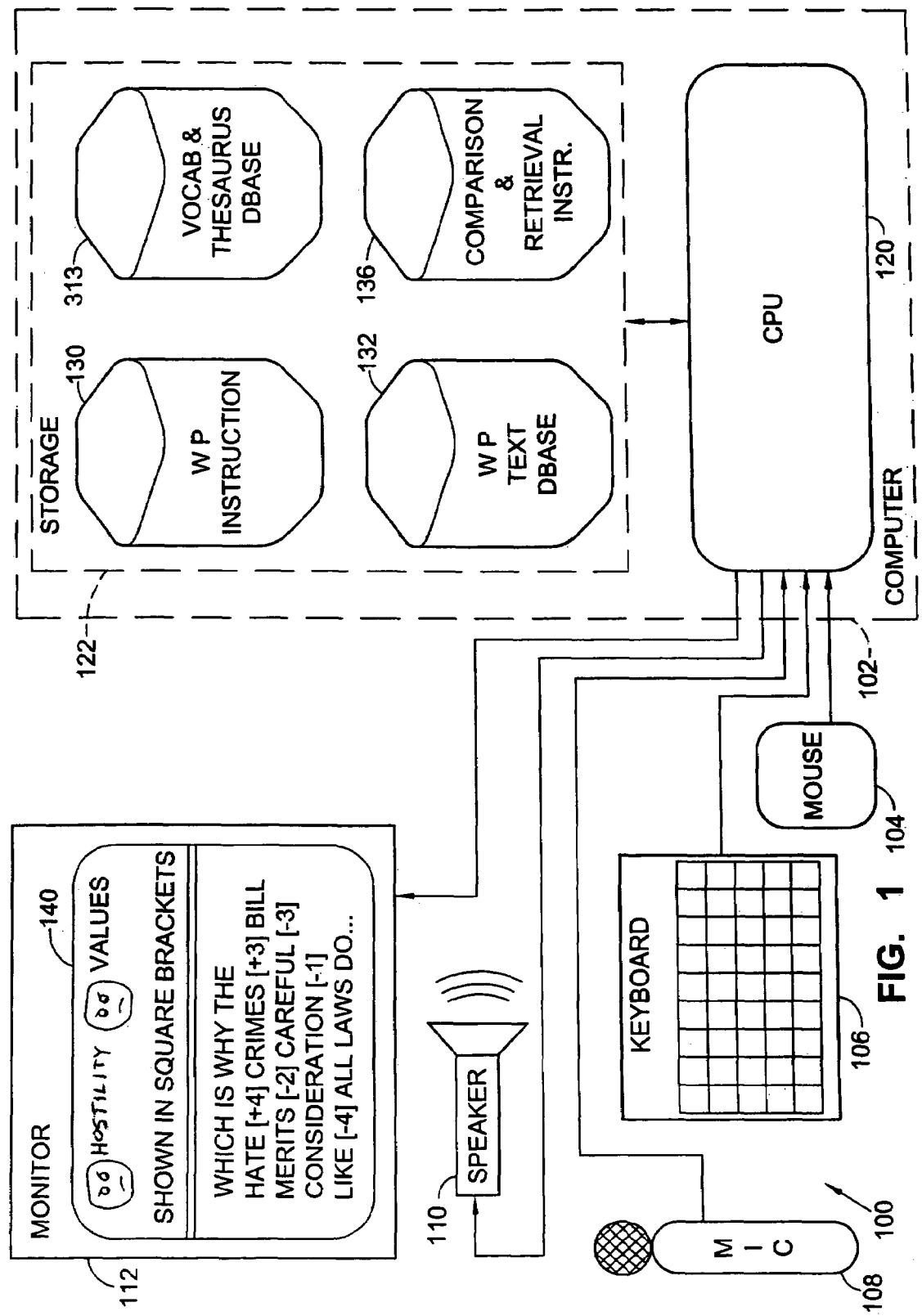
FIG. 1 is a block diagram of a first embodiment of a computer system according to the present invention.

Before starting a description of the Figures, some terms will now be defined.

Definitions

Present invention: means at least some embodiments of the present invention; references to various feature(s) of the "present invention" throughout this document do not mean that all claimed embodiments or methods include the referenced feature(s).

Lexical impact: refers to lexical emotional impact and/or lexical affective impact, and more particularly to the expected emotional impact that a word or phrase will have on an average reader, some particular reader, or some predetermined group of readers; the lexical impact may be expressed as a non-numerical value (e.g., low, medium, high) or a numerical value (e.g., −5 to +5); lexical impact refers to impact with respect to specific emotions, such as happiness, sadness and hostility, but does not refer to vague textual qualities such as active versus passive text or objective versus emotional text.

Text: includes but is not limited to written text; for example, audio in the form of words is a form of "text" as that term is used herein.

Average: includes but is not limited to statistical measurements of mean, median and/or mode; as used herein, average refers to any statistic conventionally used to represent an average, as well as any statistic for averaging that may be developed in the future.

Thesaurus grouping: sets of words grouped as they are in a conventional book-based or computer-based thesaurus; groupings of related word sets include but are not limited to synonyms, antonyms, and "related" (or "rel.") words, as these are some of the types of grouping qualities recognized by conventional thesauruses.

Ranking spectrum: refers to any quality under which words can be ranked in an ordered fashion; examples of ranking spectrums include but are not limited to ranking words for lexical impact, ranking words based on reading level, ranking words based on frequency of usage, ranking words based on number of letters that they have, ranking words based on their formality/informality, and so on.

Word: includes, but is not limited to, words, small groups of words, abbreviations, acronyms and proper names.

To the extent that the definitions provided above are consistent with ordinary, plain, and accustomed meanings (as generally evidenced, inter alia, by dictionaries and/or technical lexicons), the above definitions shall be considered supplemental in nature. To the extent that the definitions provided above are inconsistent with ordinary, plain, and accustomed meanings (as generally evidenced, inter alia, by dictionaries and/or technical lexicons), the above definitions shall control. If the definitions provided above are broader than the ordinary, plain, and accustomed meanings in some aspect, then the above definitions will control at least in relation to their broader aspects.

To the extent that a patentee may act as its own lexicographer under applicable law, it is hereby further directed that all words appearing in the claims section, except for the above-defined words, shall take on their ordinary, plain, and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate ordinary, plain and accustomed meanings (as generally evidenced, inter alia, by dictionaries and/or technical lexicons), in the situation where a word or term used in the claims has more than one alternative ordinary, plain and accustomed meaning and the specification is helpful in choosing between the alternatives.

FIG. 1 shows exemplary computer system 100 according to the present invention. Computer system 100 is a conventional personal computer hardware setup including computer 102, mouse 104, keyboard 106, microphone 108, speaker 110, and monitor 112. Additional computer components that are now conventional, as well as input or output devices developed in the future may be added to computer system 100.

Computer 102 includes central processing unit ("CPU") 120 and storage 122. CPU 120 is a central processing unit of a type now conventional (e.g., Pentium chip based), or that may be developed in the future, to accomplish processing of program instructions and requisite computations for a computer system. Storage 122 hardware preferably includes both a random access component (not separately shown) and a hard disk drive based component (not separately shown). Where exactly specific instructions and data are stored, as between the random access memory and the disk drive, is not critical to the present invention and is therefore not separately shown or illustrated. Generally speaking, instructions and/or data that need to be accessed by CPU 120 quickly or frequently should be moved to random access storage for quicker access. On the other hand, instructions and/or data that need to be stored in a permanent fashion (or even when power is not supplied to the computer) should be stored on the hard disk. Additionally or alternatively, other types of storage hardware are possible, such as read only memory, floppy magnetic disks, optical disks, magneto-optical disks, flash EEROM, and so on.

The data and instructions stored in storage 122 include word processing ("WP") instructions 130, WP text database 132, vocabulary and thesaurus database 134, and comparison and retrieval instructions 136. While these data and instructions are shown as separate database blocks 130, 132, 134, 136 in FIG. 1, it should be understood that these data do not need to be physically separated into these blocks on the various storage media that may be employed. It should be further understood that the various blocks of data or instructions 130, 132, 134, 136 do not need to be stored in a contiguous manner, but rather may be stored in a scattered fashion over one or more storage media.

WP instructions 130 are the machine readable instructions of a conventional word processor, such as Microsoft Word, Corel Word Perfect, or Wordstar. (It is noted that the names Microsoft Word, Corel Wordperfect and/or Wordstar may be subject to trademark rights.) Alternatively, WP instructions 130 may be part of a larger computer program that accomplishes functions beyond word processing. For example, presentation programs, graphic programs, and spreadsheet programs sometimes incorporate word processing functionality, and the present invention would be applicable to these types of programs as well as any other programs that include word processing functionality.

As is conventional for word processing programs, WP instructions 130 allow the author to input and revise text. WP instructions 130 further control the storage and maintenance of text in machine readable form. For example, new text may be input through (1) an author's manipulation of the input devices, 104, 106, 108 shown in FIG. 1; (2) a preexisting word processing file stored on a storage medium; or (3) through a computer network that sends a word processing file to computer system 100 via a communication device (e.g., a modem). For example, the process may be extended to operate over a website interface. Functionality may be the same as the word processing version or, alternatively, may be limited such that a summary report is generated for any uploaded document rather than allowing full word substitution capabilities and all other functionalities.

In addition to some of the more fundamental functions discussed above, WP instructions 130 may include other word processing features now conventional or that may be developed in the future. Such other features include automatic text wrap, automatic scrolling, spell checking, tables, font selection, point size selection, color selection, insertion of graphics, and the like.

WP text database 132 is preferably a conventional word processing format file that can be stored on the hard magnetic disk and/or in random access memory, as appropriate. WP text database 132 provides the text words that are the raw materials for using the lexical impact and ranked thesaurus features of the present invention, which will be discussed in more detail below.

Vocabulary and thesaurus database 134 is a special database according to the present invention that includes vocabulary words and phrases and respective associations between each word or phrase and lexical emotional impact, reading level and/or thesaurus groupings. Generally speaking, this database allows an author to determine lexical impact of various words in the text. Through the thesaurus groupings, the author can also request alternative words and their associated rankings (with respect to various ranking spectrums). By using vocabulary and thesaurus database 134, the author can optimize the words of a text for optimal lexical impact. The author can also better evaluate alternative word choices with respect to other rankable qualities using the ranked thesaurus features discussed below.

Comparison and retrieval instructions 136 are machine readable instructions that allow the vocabulary and thesaurus database 134 to interface with WP instructions 130. For example, comparison instructions (not separately shown) compare words of the text in WP text database 132 with words in vocabulary and thesaurus database 134 so that lexical impact of various words in the text can be indicated to the author. Additionally, retrieval instructions (not separately shown) retrieve thesaurus grouping information from vocabulary and thesaurus database 134, so that alternative words can be provided to the author, along with an indication of rankings of the words with respect to some ranking spectrum. This will be further explained below in the discussion of subsequent Figs.

Mouse 104 and keyboard 106 are conventional input devices and will not be discussed in detail herein. Preferably, mouse 104 and keyboard 106 are used to input text under control of WP instructions 130 into WP text database 132. In the usual situation, an author types text into the keyboard and uses the mouse to locate the cursor in order to make selected revisions to the text. Also shown in FIG. 1 is microphone 108. Microphone 108 allows computer system 100 to receive voice input data from the author, as is now conventional with some word processing programs.

Speaker 110 is an output device that allows the text to be output as audio data (e.g., for the hearing impaired). Another output device is monitor 112. Monitor 112 is preferably a monitor of conventional construction, such as a liquid crystal display monitor or a cathode ray tube monitor. Monitor 112 includes display 140, which is where the WP text, indications of lexical impact, and various thesaurus data according to the present invention are preferably displayed to the author. Display 140, as shown in FIG. 1, will be discussed below after a brief discussion of a computer architecture variation shown in FIG. 2.

Figure 2:
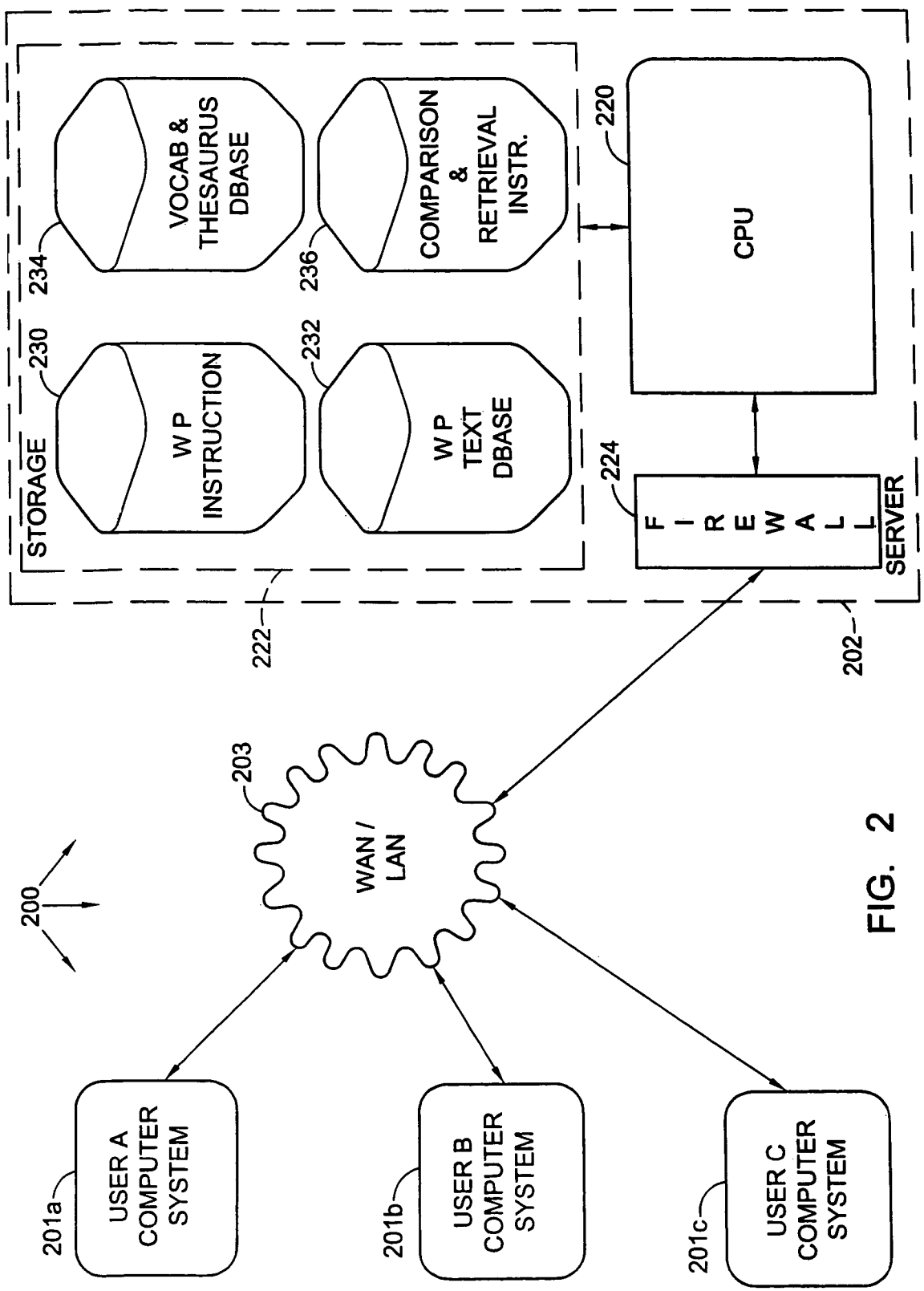
FIG. 2 is a block diagram of a second embodiment of a computer system according to the present invention.

FIG. 2 shows computer system 200, which is a network-based variation in the computer architecture of previously-described computer system 100. In computer system 200, the processing is performed on server computer 202. Server computer 202 includes CPU 220, storage 222 and firewall 224. While server computer 202 is shown as a single machine, the data, instructions, and processing capabilities of server computer 202 could alternatively be divided up among more than one server computer. CPU 220 and storage 222 are respectively similar to CPU 120 and storage 122 discussed above, and these components will therefore not be discussed in detail. Firewall 224 is a conventional firewall utilized to prevent unauthorized access to CPU 220 and storage 222. Firewall 224 is utilized because server computer 202 is connected to a network, and is therefore vulnerable to unauthorized access. Firewall 224 is designed to identify and prevent such unauthorized access.

As further shown in FIG. 2, user A computer system 201a, user B computer system 201b and user C computer system 201c are computer systems for three users. Each computer system 201a, 201b, and 201c is connected to server computer 202 over a wide area network ("WAN")/local area network ("LAN") 203. For example if network 203 is a WAN, then the user computers will generally be located at considerable distance from server computer 202. One example of a WAN is the Internet. On the other hand, if network 203 is a LAN, then the user computers will generally be in the same building as server computer 202. One example of a LAN is the intranet implemented by a business concern for business communications within a relatively circumscribed area. Whether network 203 is a WAN or a LAN, the idea is that several user computer systems 201a, 201b, 201c can share the processing power and data of a single server computer system. The network embodiment computer system 200 shows word processing instructions and databases, as well as all vocabulary and thesaurus instructions and databases, located at server computer 202. However, portions of these instructions and/or databases may additionally or alternatively be present on the various user computer systems 201a, 201b, 201c.

Returning now to display 140 of FIG. 1, the first two lines of the display read "Hostility values shown in square brackets." This serves as an indication that the author has requested to see the lexical impact of the text, with respect to the emotional (or affectual) response of hostility. Some words or phrases of the text will be in the vocabulary database 134. These words or phrases in the vocabulary database will have associated lexical impacts that may optionally include values (or valences) reflecting the hostility response in readers. The hostility values will indicate how angry (or opposite-of-angry) each recognized word is.

While the lexical impact category of "hostility" has been used for simplicity of illustration, it is noted that "hostility" is probably a more common descriptor and/or grouping used in psychological literature. It is preferable to use the descriptors that will be most readily understood by the author-users of the software of the present invention. If they are psychologists, then categories like "hostility," "depression," and "manic" may be preferable. If the author-writers do not have psychological training, then categories like "happy," "sad," and "angry" may be more appropriate.

As shown in display 140 of FIG. 1, the hostility values for recognized words are displayed immediately following each word of the text in square brackets. In this example, the hostility values may take on integer values between −5 and +5, but other numbering schemes, such as allowing fractional quantities or restricting quantities to positive values, could alternatively be used. As a further alternative, the lexical impact values do not have to be in the form of numbers at all. For example, lexical impact values for hostility could include increasing levels of: annoyance, disturbance, temper, and rage. As another example, lexical impact values for hostility could include text colors or shades of colors that represent varying degrees of hostility. These evocative, non-numerical values may be advantageous in that readers can more readily relate to verbal and/or visual descriptors than they can relate to numbers. However, it should be kept in mind that the use of numbers will make statistical analyses (as further explained below) easier to accomplish.

As shown in FIG. 1, "hate" has a +4 lexical impact for hostility and "crimes" has a lexical impact for hostility of +3. Not only is this because these are words that would be commonly thought of as being hostile, but, also because they are listed in the psychosocial dictionaries that categorize words by their affective and psychological valence. As a matter of fact, psychosocial dictionaries constitute excellent source (or legacy) material for assigning lexical impact values for the present invention, so long as the dictionaries are used in a manner consistent with any applicable copyright law.

Indeed, it is advantageous to determine lexical impacts for words, with respect to various specific emotional responses, through a controlled, laboratory, psychological study. Even though certain words are relatively neutral in a denotative sense, they may have a high degree of lexical impact. Preferably, determining the lexical impact for a word involves isolating the lexical impact and completely ignoring the denotative meaning of the word. In other words, lexical impact of a word is determined without looking at the context in which the word is used.

By way of example, the word "striking" as used in the phrase, "she wore a striking red dress", denotes that the dress attracts a lot of attention. The word "striking" is clearly not being used in a violent sense. However, "striking" may have a strong lexical impact with respect to hostility since the nature of the word may evoke feelings of being attacked or fighting in general. According to the present invention, the lexical impact of the word "striking" is determined without resort to the context in which it is used. In other words, "striking" will have the same lexical impact value(s) regardless of how it is used in any particular sentence.

While some such studies have been done (e.g., in developing the above cited dictionaries), the various computer implementations of the present invention may make it considerably easier for a large number of people to use lexical impact information in a meaningful way. This, in turn, may spur considerable additional psychological research in order to obtain more types of lexical impact for more vocabulary words with more precision. Clearly, the more precisely and accurately that lexical impact values are determined, the better control an author can have over the lexical impact of a piece of text.

As further shown at display 140 of FIG. 1, the words "merits," "careful," "consideration" and "like" all have negative lexical impacts for hostility. In this case, these word choices were intentional. More particularly, the author was writing about a hate crimes bill. However, the author desires the text to avoid being inflammatory, and to avoid causing hostility—or other possible reactions to hostility, such as anxiety—in readers. However, the author could not very well discuss a hate crimes bill without using the words "hate" and "crimes." Therefore, the author chose to try to counterbalance the angry lexical impact of the words "hate" and "crimes" through the use of many anti-angry words such as "merits," "careful," "consideration," and "like."

In this example, the author did not want to change the contextual meaning of the text being written, but rather wanted to keep careful control of lexical impact, which is a different objective. Conventionally, most authors do not think in these terms. This may be because there has never been an easy-to-use tool that allows them to analyze and control their text for lexical impacts of various words. It is possible that the computer implementations of the present invention will make lexical impact analysis and other types of textual analysis more popular, and will thereby facilitate clearer and more precise verbal communication between people.

Figure 3:
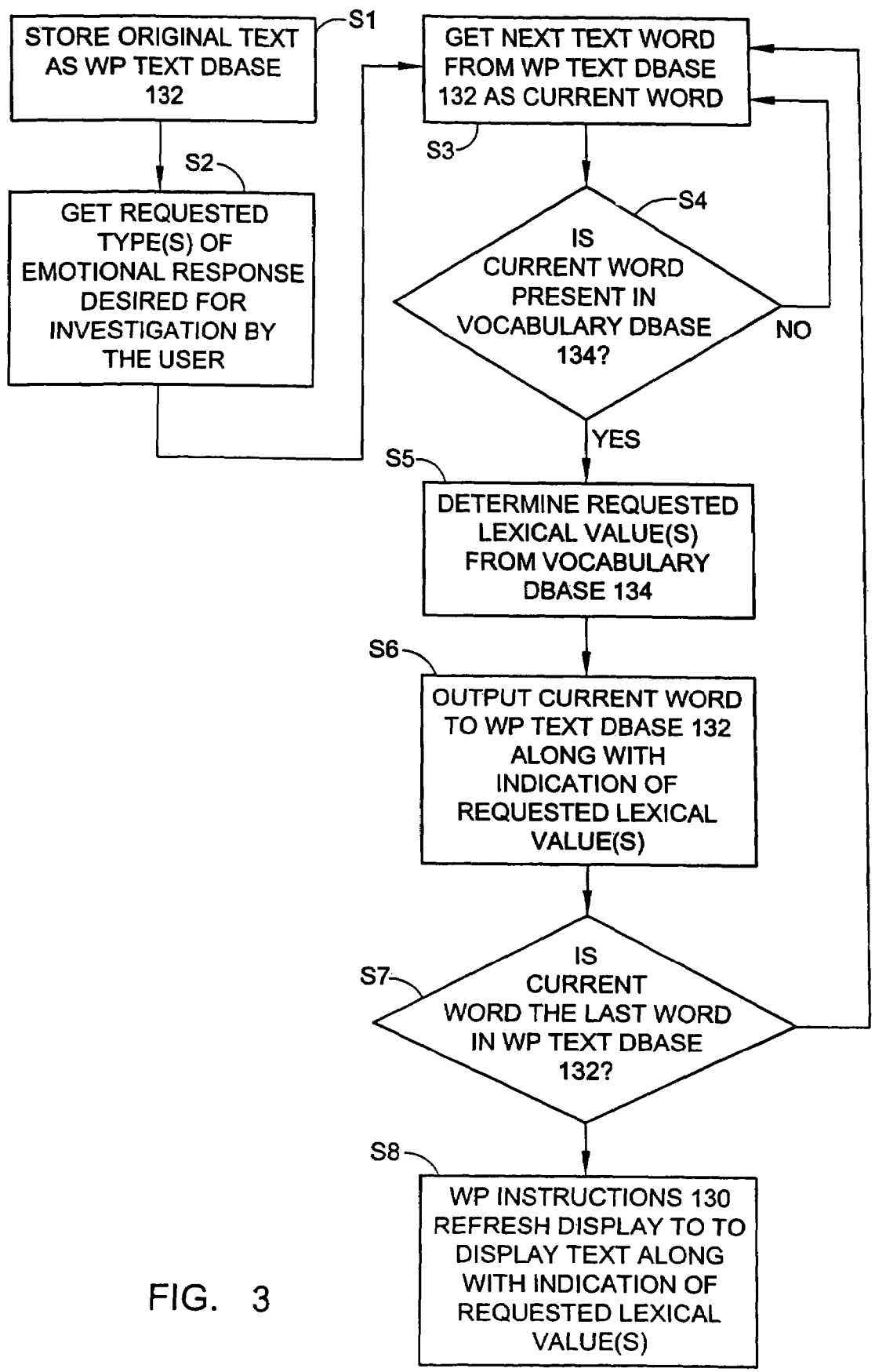
FIG. 3 is a flowchart showing exemplary comparison processing to indicate lexical impact according to the present invention.

The flowchart of FIG. 3 and the vocabulary database table of FIG. 4 will now be used to describe how comparison and retrieval instructions 136 use vocabulary and thesaurus database 134 to display lexical impacts, as shown at display 140 of FIG. 1. At step S1 of the FIG. 3 flowchart, some text is stored in WP text database 132 of computer system 100. As previously stated, this text could come from many difference places, such as from typing, through the Internet, from a file stored on a disk, or from the operation of an optical character recognition program. This text in WP text database 132 is the text that will be analyzed for lexical impact.

At step S2, the requested types of emotional response are received from the author. More specifically, as shown in FIG. 4, the vocabulary database includes fields for three kinds of distinct lexical impacts: (1) happiness, (2) depression; (3) hostility. Alternatively, the vocabulary database could define more or fewer distinct types of lexical impacts, and could utilize different emotional responses. Other affective categories that could be determined include anxiety, pessimism, insecurity, compassion, openness, optimism, self-confidence, analytical mindedness, and artistic. The types of affective categories that are determined will probably be largely a function of the available lexical impact data, as well as what is sufficiently salient to people so that data bases for these categories are developed. Again, as further lexical impact psychological studies are performed, this will result in additional and more precise data for the vocabulary database of FIG. 4. However, structuring the lexical impact value for each word as a series of values for various types of emotional responses (or affective categories) provides a flexible data structure that can grow. Specifically, further value fields can be added to the vocabulary database of FIG. 4 as information is obtained for new emotional responses.

Once the specific type of emotional response is chosen by the author at step S2, processing proceeds to step S3 where the first text word is selected from the WP text database 132 and identified as a current word for comparison against the vocabulary database of FIG. 4. For example, the first text word shown in display 140 of FIG. 1 is the word "which."

Processing then proceeds to step S4, where the current word is compared to the entries in the vocabulary database of FIG. 4, to determine whether the particular present in the vocabulary database. On this first time through the processing loop starting with step S3, the current word is "which." By reviewing the entries under vocabulary word in the vocabulary database of FIG. 4, it is apparent that "which" is not present, so no lexical impact value can be assigned or indicated for this particular word. Therefore, processing loops back to step S3 where the next word of WP text database 132 is now identified as the current word. Looking back at display 140 of FIG. 1, the next three words are "is," "why," and "the." Because none of these words are in the vocabulary database of FIG. 4, processing will keep looping through steps S3 and S4. This happens until processing gets to the word "hate." Once this word is ascribed as the current word at step S3, processing again proceeds to step S4, but this time the word "hate" does happen to be in the vocabulary database of FIG. 4. Processing proceeds to step S5 where the requested lexical value or values are obtained from the vocabulary database of FIG. 4. In this example, the requested type of emotional response is hostility. As shown in FIG. 4, the hostility value for "hate" is +5 (this, of course, means that "hate" is a strongly angry word).

Processing then proceeds to step S6, where the current word is output back to WP text database 132, along with an indication of the requested lexical value. In the present example, this means that the word "hate," along with its +5 lexical value, is sent back to WP text database 132. Depending upon how the software is set up, this word and value may replace the text that was previously stored in the database, or it may become part of a new and separate WP text word processing file.

Processing proceeds to step S7, where it is determined if the current word is the last word present for analysis in WP text database 132. According to the present example, "hate" is not the last word. Processing would therefore proceed back to step S3, so that the subsequent words of the document ("crimes," "bill," "merits," and so on) can be taken up in order. When processing reaches the last word of WP text database 132, processing proceeds to step S8 where display 140 is refreshed to indicate the lexical impact values that the author has requested. In this embodiment, the lexical impact values are indicated by numbers.

According to other embodiments, the lexical values are indicated by coloration of the words. For example, words with a positive lexical impact value for hostility could be shown in red, while those with a negative lexical impact value for hostility could be shown in blue. In addition, words having a positive lexical impact value for hostility could be shown in varying shades of red depending on their relative positive lexical impact. By way of example, words having a high relative positive lexical impact (i.e., an hostility value of +4 or +5) could be shown in a dark red shade, while words having a low relative positive lexical impact (i.e., an hostility value of +1 or +2) could be shown in a light red shade. Words having a moderate relative positive lexical impact (i.e., an hostility value of +3) could be shown in a medium red shade. Similarly, words having a negative lexical impact could be shown in varying shades of blue to indicate their relative negative lexical impact. For example, words having a high relative negative lexical impact (i.e., an hostility value of −4 or −5) could be shown in a dark blue shade, while words having a low relative negative lexical impact (i.e., an hostility value of −1 or −2) could be shown in a light blue shade. Words having a moderate relative positive lexical impact (i.e., an hostility value of −3) could be shown in a medium blue shade.

As would be understood to those of skill in the art, there exist numerous alternative ways to display the relative lexical impact of individual words. For example, variations in graphics, highlighting, font, point size of font, bold, italics, underlining and combinations thereof can be used to display the relative lexical impact of individual words without departing from the scope of the present invention.

Variations too numerous to specifically discuss are possible with respect to the processing of the flowchart of FIG. 3. For example, the various words of WP text database 132 could be taken in reverse order or in any other order. As a further alternative, it could be initially determined which words are present in the vocabulary database of FIG. 4, prior to retrieving any specific lexical values for any specific words. As yet another alternative, the display could be continually refreshed as each word is analyzed. These variations could go on and on, but the important thing is that the lexical value, for the appropriate emotional response, is determined and somehow indicated to the author.

One further issue regarding the display of lexical impact values involves the display of words that are not present in the vocabulary database of FIG. 4. More particularly, it may help the author somewhat if an indication were provided that the word was, in fact, not in the vocabulary database of FIG. 4. One way this might be accomplished is by putting the letters "n/a" in square brackets after every word not present in the database. On the other hand, this additional display may make the text difficult to follow when it is displayed with lots of "n/a" indications. Another way would be to dim the words not in the database.

An additional minor issue regards words that have a relevant lexical impact value of 0. One alternative is to indicate that the word is present in the vocabulary database, but that its lexical impact value is 0, or neutral. Again, this may unduly clutter the display. Another alternative is to simply omit any special indications for words that have a relevant lexical impact value of 0.

Now that the lexical impact functionality of the present invention has been described with reference to FIGS. 3 and 4, attention will turn to the ranked thesaurus aspects of the present invention, which will be discussed with reference to FIGS. 4 to 7. In the exemplary embodiment of FIGS. 4 and 5, the thesaurus functionality draws its data from both the vocabulary database of FIG. 4 and the thesaurus database in FIG. 5. As shown in the last column of FIG. 4, the vocabulary database has a field where thesaurus groupings can be stored. Some words may not belong to any thesaurus grouping, such as the words "careful" and "crimes," as shown in FIG. 4. However, most vocabulary words have at least one associated thesaurus grouping, and some have more than one. For example, the word "merits" belongs to thesaurus group number 2, as well as thesaurus group number 3, as shown in FIG. 4. Also, the thesaurus groupings column of the vocabulary database of FIG. 4 indicates the identity (e.g., synonym, antonym, related) of the word within the thesaurus group to which it belongs. Looking again at the word "merits," the thesaurus groupings column indicates that "merits" is a synonym in thesaurus group 2 and that "merits" is also a synonym in thesaurus group 3. In this example, the word "merits" belongs to two different thesaurus groupings, because this word has somewhat different meanings depending upon whether it is used as a noun or as a verb. This will become more apparent when FIG. 5 is discussed.

Moving now to FIG. 5, the four numbered rows respectively correspond to four different thesaurus groups. Storing words in thesaurus groups, even on a computer, is conventional at this point in time, so FIG. 5 will not be discussed in detail. However, it is noted that in thesaurus group 2, the word "merits" is listed in its noun sense, so that the listed synonyms, antonyms, and related words of thesaurus group number 2 represent possible alternatives for the word "merits," when the word "merits" is used as a noun. Moving attention to thesaurus group number 3, there the word "merits" is listed in a thesaurus group based on the verb sense of the word "merits." In thesaurus group number 3, the synonyms, antonyms, and related words represent possible alternatives for the word "merits," when that word is used as a verb. According to other embodiments, words having dual usage (such as "merits", which can be used as a noun or a verb) can be associated with a single thesaurus group including synonyms, antonyms, and related words representing alternatives for the word "merits", whether the word is used as a noun or a verb.

An important feature of the present invention, unlike conventional computer-based thesauruses, is that the thesaurus grouping can be presented in a ranked fashion. Most, if not all, conventional thesauruses, whether book-based or computer-based, simply set forth the relevant synonyms, antonyms, related words and other acceptable alternatives, without providing guidance as to which alternatives might be the best alternative word choice. According to the present invention, the conventional thesaurus database shown in FIG. 5 is used in conjunction with the vocabulary database of FIG. 4, to provide thesaurus-type output along with associated rankings for the various words.

Figure 6A:
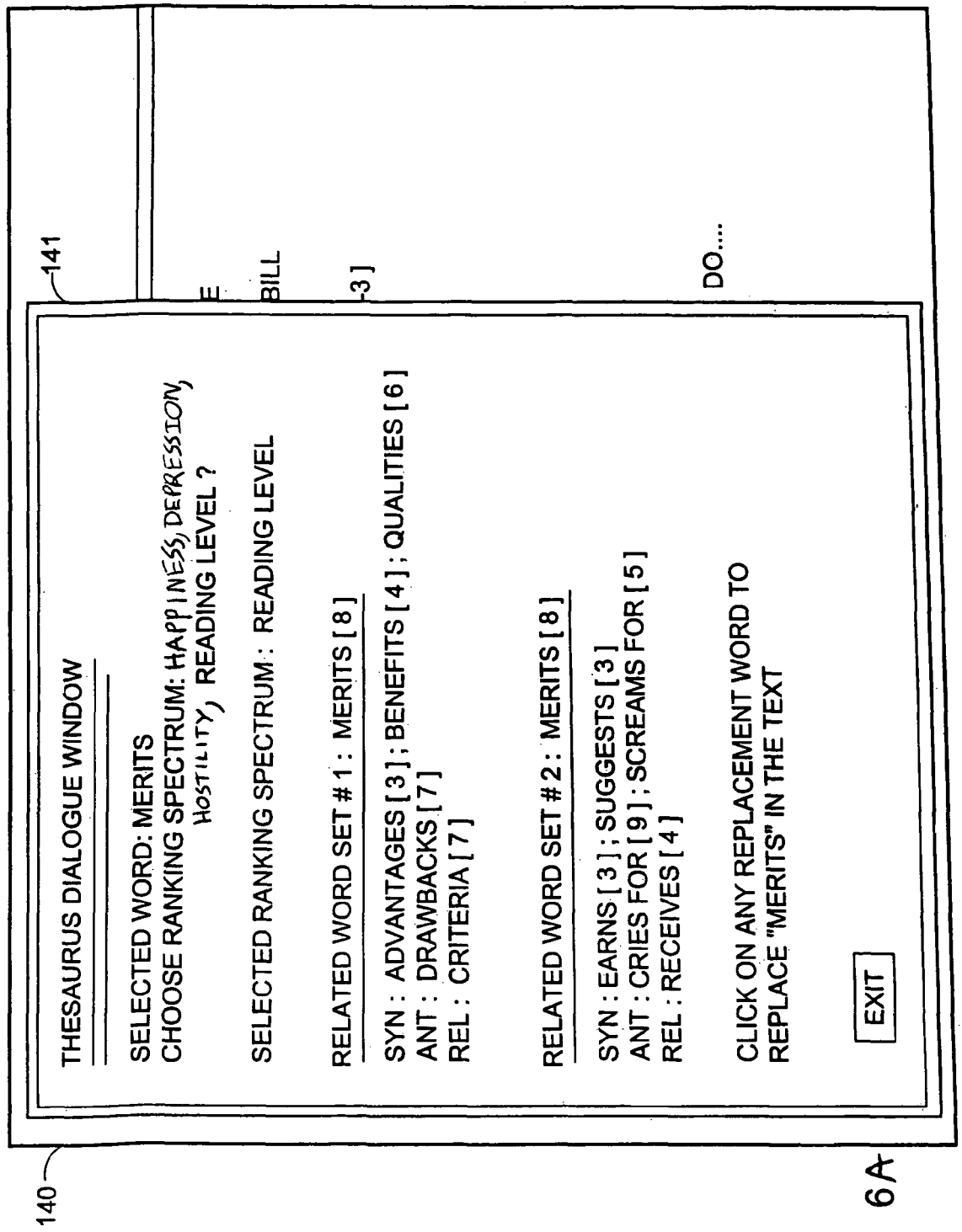
FIGS. 6A-6C are interactive screen displays generated when using the thesaurus features of the present invention.

The exemplary thesaurus dialogue window of FIG. 6A shows one way in which the databases of FIGS. 4 and 5 can be pulled together to show alternative words in a ranked fashion. More particularly, in FIG. 6A the author has activated a thesaurus dialogue window 141 within display 140. The author has done this in order to explore alternatives to the word "merits," as used in the exemplary text of FIG. 1.

Specifically, the author believes that the word "merits" is a word that is too difficult for the intended audience of the text to understand. As shown in FIG. 4 at the reading level column, "merits" does indeed have an ascribed reading level of grade 8. The author believes, with some justification, that an alternative word having a lower associated reading level can be substituted for "merits." The thesaurus groupings and reading level ranks of the vocabulary database of FIG. 4 can indeed aid the author in the search for an alternative word by providing the author with the alternatives, along with an indication of reading level for the various alternatives.

Moving through the thesaurus dialogue window of FIG. 6A on a line-by-line basis, the thesaurus window is activated by having the author activate the thesaurus feature while a cursor is located on the word "merits" in the document. Therefore, the computer knows that the selected word is "merits," and that is listed as the selected word in the second line of the thesaurus dialogue window 141. Next, the computer asks the author to choose the appropriate ranking spectrum. As shown in FIG. 4, the vocabulary database deals with several different types of ranking spectrums. First there are the various lexical impact values (happiness, depression, hostility) and there is also reading level. In this example, the author utilizes a cursor to select reading level as the appropriate ranking spectrum, so that the fourth line of thesaurus dialogue window 141 indicates that reading level is the selected ranking spectrum.

As discussed above, the word "merits" belongs to two difference thesaurus group numbers. Therefore, both thesaurus groupings are listed separately in thesaurus dialogue window 141. Thesaurus dialogue window 141 concludes with an admonition to click on any of the listed replacement words, to replace the word "merits" in the text, and also a button to allow exit from the thesaurus dialogue window 141 without any modification of the document. Of course the mere listing of synonyms, antonyms and related words, as shown in thesaurus dialogue window 141 is not new. What is new and different is that the words appear along with an indication of associated rankings on a ranking spectrum. In this example, the rankings are based on reading level value across a ranking spectrum of grade 1 reading level to grade 12 reading level.

In this example, the author realizes that the word "merits" has been used as a verb in the text and therefore focuses attention on related word set number two in thesaurus dialogue window 141, which deals with the word "merits" when used as a verb. By reviewing the various synonyms, antonyms, and related words of word set number two, the author can readily see that "earns" is a synonym that may be acceptable (although albeit a little less elegant) in context of the passage, and that "earns" also has a considerably lower reading level than the word "merits." More particularly, merits had a grade 8 reading level as shown in FIG. 6A, while "earns" has a grade 3 reading level. The author may decide to replace "merits" with "earns" by clicking on the word "earns" in thesaurus dialogue window 141.

Another possible word choice that deserves some attention is the related word "receives." As shown in thesaurus dialogue window 141, "receives" has a reading level of grade 4, which is considerably lower than the grade 8 reading level of the word "merits." Furthermore, in context of the passage shown at display 140 of FIG. 1, the word "merits" could be replaced with the phrase "should receive," and the resulting passage would still read very well, even at a mere grade 4 reading level. In view of this alternative, the author may activate the exit button of thesaurus dialogue window 141, thereby returning to the text so that the revision from "merits" to "should receive" can be entered manually through keyboard 106.

It is noted that the various lexical impact values could also be used as the relevant ranking spectrum. In other words, if the author wanted to make the passage happier, less happiness, more depressing, less depressing, more hostile, less hostile and so on, the thesaurus can be repeatedly referenced utilizing the various lexical impact values appropriately rank the synonyms, antonyms and related words of the thesaurus grouping. While it may be possible to provide a limited ranked thesaurus in book form, by implementing a ranked thesaurus on computer, the data selectively displayed by the author can be limited to one, or a relatively small number of ranking spectrums, so that the limited display of thesaurus dialogue window 141 will not be too difficult to digest. Such a selective display is more difficult to accomplish through the medium of a book, wherein repetition of rankings with respect to many different ranking spectrums could yield the book voluminous or difficult to understand.

Figure 6B:
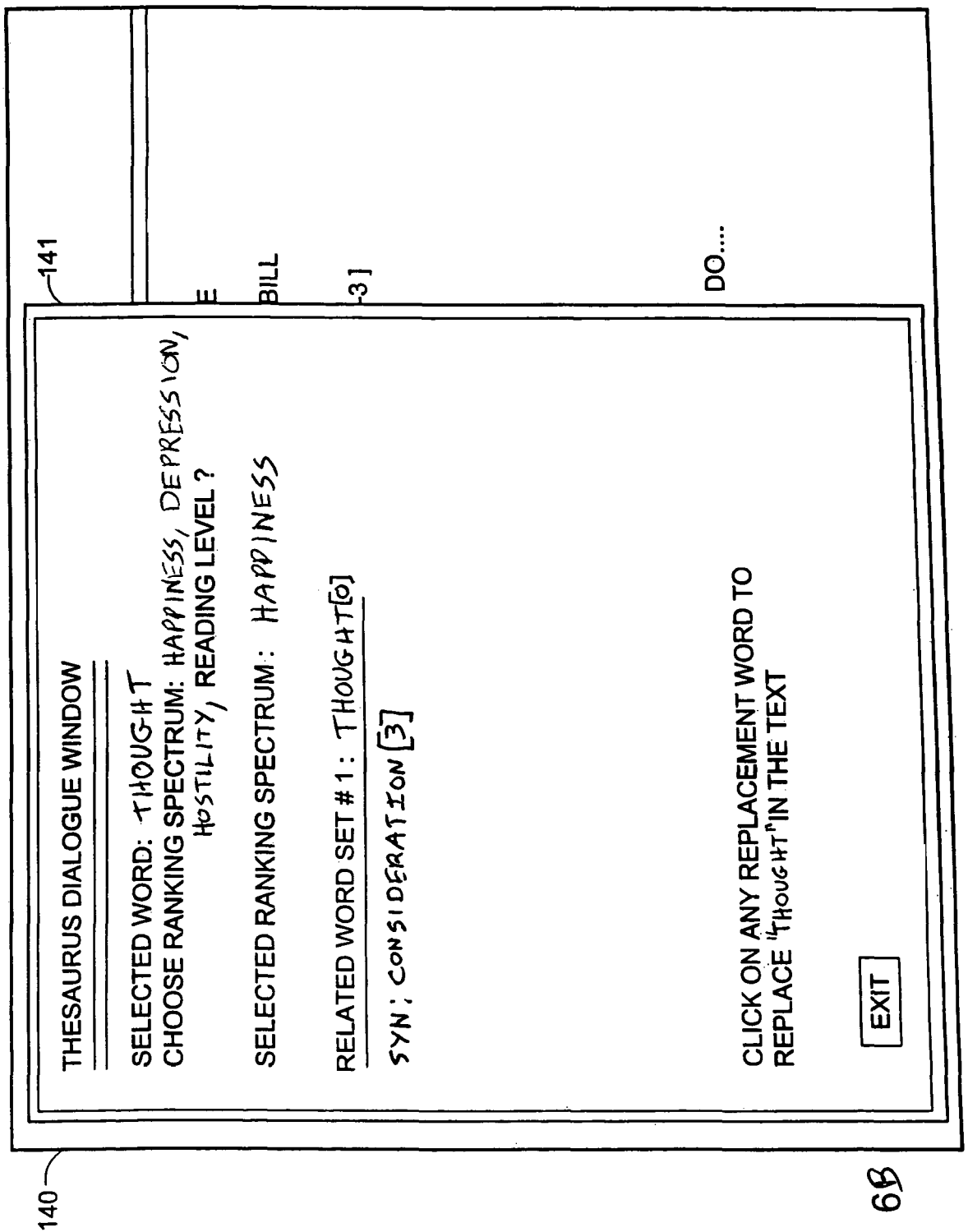

Referring to the thesaurus dialogue window of FIG. 6B, the program is configured to allow a user to highlight any lexical impact scale (i.e., happiness, depression, hostility, etc.) for a particular word and then sequence through the words that have a positive valence on that lexical impact scale, with potential replacements that also score positive valences on that scale identified for the user's consideration. The potential replacements are preferably sorted alphabetically by highest valence. In the illustrated embodiment, the thesaurus window is activated by having the author activate the thesaurus feature while a cursor is located on the word "thought" in the document. The author utilizes a cursor to select happiness as the appropriate ranking spectrum. In this example, only within-scale substitutions are highlighted as possible replacements such that the program only suggests words having a positive valence in the lexical impact scale in question. In this case, only the word "consideration" appears in the related word set.

Figure 6C:
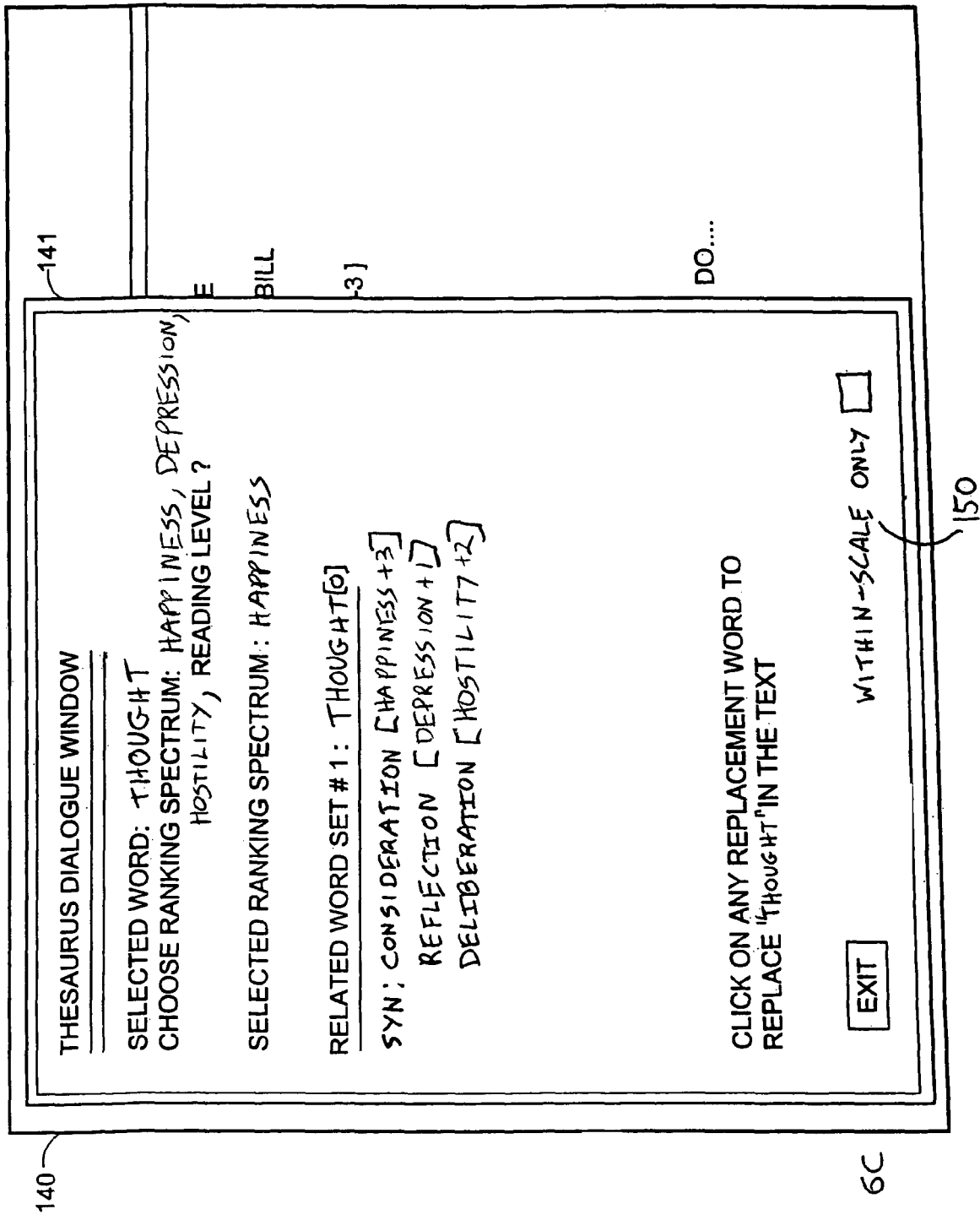

Referring to FIG. 6C, according to other embodiments, functionality is extended to allow the user the option of allowing only within-scale substitutions or expanding the potential substitutions to those of other lexical impact scales. The author may check a "Within-Scale Only" box 150 to cause only within-scale substitutions to be highlighted. Otherwise, out-of-scale substitutions, such as having positive valences for depression and hostility are included as related words. For clarification purposes, each related word is listed along with the ranking spectrum and valence. For example, the potential replacements for "thought" now include "consideration" (happiness +3), "reflection" (depression +1) and "deliberation" (hostility +2). By allowing out-of-scale substitutions, an author's task of increasing hostility or depression and decreasing happiness within a writing is potentially much easier if the author makes a direct substitution of an hostility or depression word for a happiness word. The program may optionally be configured to highlight zero-valence substitutions as well.

According to some embodiments of the present invention, the computer program is designed to analyze words based upon sequential aspects of valences in particular categories. Such a function may be used to ensure the amplification of the desired effect at the right time within the writing as opposed to averaging the desired effect over the entire writing. In some circumstances, the order of the effect may be just as important (if not more important) than the average effect.

By way of example, suppose an author is crafting a three-paragraph political action letter with the object of persuading others to act in a particular manner. Of course, there are overall targets for the desired emotional impact of the letter. For overall effect, assume that the preferred settings for the program's six lexical impact scales are as follows: Anxiety: Medium; Hostility: Medium; Depression: Low; Confidence: High; Compassion: Medium; Happiness: Low. These preferred settings are overall values, averaged over the entire letter. However, one may desire to concentrate particular emotional impacts in each paragraph. For example, the author may wish to include a highly hostile first paragraph and a highly anxiety-ridden last paragraph. Accordingly, the program permits the author to analyze individual sections of a writing on a section by section basis. In operation, the document may be analyzed by paragraph, by partitioning the document by percentage (i.e., first ⅓, second ⅓, last ⅓) or by using the cursor to highlight individual sections of the document. This function permits more careful crafting of the emotional impact as a function of the reader's progress in the letter.

The thesaurus database may be expanded to include a homonym function for analyzing the effect of spoken words in addition to written words. For example, the word "discussed" may sound like "disgust" when spoken. This would likely provide an unwanted effect on the listeners. To prevent such an effect, a user may click an "Aural Impact" button to activate an aural impact feature. When this feature is activated, any words or phrases that contain undesirable aural effects are highlighted. By way of example, the words may be bolded, underlined, italicized or otherwise made to stand out from the other words. Additionally, the aural impact feature also identifies the auditory equivalent of compound words (e.g., "let us") that generate the sound of another word (e.g., "lettuce") or compound word.

According to some embodiments of the present invention, the program may be used to suggest replacement words that assist in achieving targeted scale values. These targeted scale values may be overall values or sequential values. Unlike previous embodiments, the program needs to make a contextual analysis in order to arrive at appropriate suggestions for replacement words. This contextual analysis may be extremely complicated.

By way of example, a user has a specific type of letter in mind and directs the program to scan the letter and make suggestions to replace certain words based upon target effect values for anxiety, hostility, depression, confidence, compassion and happiness. The program then performs a method including the steps of: (1) comparing the letter to the target values; (2) identifying the discrepancies between the current and target values; (3) searching for words having valences that are exacerbating the discrepancies; (4) identifying the context of the words in question; (5) identifying the context of all the replacement words that would assist in moving the valence in the appropriate direction; and (6) displaying the replacement words to the user.

As seen in FIG. 7, a phrase database 135 is also provided. The phrase database 135 includes cliches, idioms, maxims, adages, sayings or the like as well as associations between each phrase and lexical emotional impact, reading level and thesaurus groupings. In some embodiments, the phrase database 135 is part of the word database 134. According to other embodiments, the phrase database 135 is separate from the word database 134.

Phrase database 135 allows an author to determine the lexical impact of phrases within the text and allows the author to substitute alternative words or phrases. Further, the phrase database 135 can be used to identify and replace unwanted trite phrases such as cliches. By using the phrase database 135, the author can both optimize lexical impact and improve writing style by identifying certain phrases and replacing them with alternative wording regardless of their lexical impact.

By way of example, as seen in FIGS. 7 and 8, the phrase, "once in a blue moon", is an antonym of "frequently" in thesaurus group 1. The entire phrase may be evaluated as having a −1 lexical impact for happiness, a +2 lexical impact for depression and a +1 lexical impact for hostility. These lexical impact values can be determined by assigning individual lexical impact valences for each word in the phrase and then summing the individual valences. Therefore, assuming "blue" has a −3 lexical impact for happiness, "moon" has a +2 lexical impact for happiness and the other words ("once", "in" and "a") do not appear in the database, then the total lexical impact for happiness for the phrase "once in a blue moon" is −1 (i.e., the sum of −3 and +2).

The exemplary thesaurus dialogue window of FIG. 9 shows one way in which the databases of FIGS. 7 and 8 can be pulled together to show alternative words and phrases in a ranked fashion. More particularly, in FIG. 9 the author has activated a thesaurus dialogue window 137 to explore alternatives to the phrase "clean as a whistle" because he believes the phrase is a cliché that detracts from the writing. Further, the author seeks a more positive tone to the writing and, therefore, is searching for replacement words and phrases having a more uplifting lexical impact.

Upon activating the exemplary thesaurus dialogue window of FIG. 9, the author observes that the word "spotless" is a synonym for "clean as a whistle". Further, the author notices that "spotless" (lexical impact of +2 on confidence) is a more "confident" term than "clean as a whistle" (lexical impact of +1 on confidence). Since "spotless" is both an appropriate substitute wording and a more "confident" term, it is a suitable replacement for "clean as a whistle". In this manner, the thesaurus groupings and lexical impact valences can indeed aid in the search for alternative wordings by providing the author with the alternatives, along with an indication of lexical impact valences for the various alternatives.

Moving through the thesaurus dialogue window 137 of FIG. 9 on a line-by-line basis, the thesaurus window 137 is activated by having the author activate the thesaurus feature while a cursor is located on the phrase "clean as a whistle" in the document. Therefore, the computer knows that the selected phrase is "clean as a whistle," and that it is listed as the selected phrase in the second line of the thesaurus dialogue window 137. Next, the computer asks the author to choose the appropriate ranking spectrum. As shown in FIG. 7, the phrase database deals with several different types of ranking spectrums. First there are the various lexical impact values (happiness, depression, hostility) and there is also reading level. In this example, the author utilizes a cursor to select happiness as the appropriate ranking spectrum, so that the fourth line of thesaurus dialogue window 137 indicates that reading level is the selected ranking spectrum.

As explained above, the mere listing of synonyms, antonyms and related words and phrases, as shown in thesaurus dialogue window 137 is not new. The novelty is that the words and phrases appear along with an indication of associated rankings on a ranking spectrum providing a convenient tool for evaluating and substituting alternative word choices. Thus, clichés and other overused phrases can be identified and conveniently replaced as desired by the author. In this example, the rankings are based on a lexical impact value for happiness.

Although "spotless" is the preferred choice as a replacement for the phrase, "clean as a whistle", another possible replacement is the related word "sterile." As shown in thesaurus dialogue window 137, "sterile" has a lexical impact value of −1 for happiness. Since the author is trying to set a more positive tone for the writing, the term "sterile", having a −1 impact value for happiness, is not a good replacement as compared to "spotless", which has a +3 impact value for happiness.

It is noted that the various reading levels could also be used as the relevant ranking spectrum. In other words, if the author wants to make the passage more appropriate for a lower reading level, the thesaurus can be repeatedly referenced utilizing the various reading levels to appropriately rank the synonyms, antonyms and related words of the thesaurus grouping.

An exemplary search-and-replace function utilizing the vocabulary database of FIG. 4 and the thesaurus database of FIG. 5 will now be explained in connection with the flowchart of FIG. 10 and exemplary display of FIG. 11.

Figure 10:
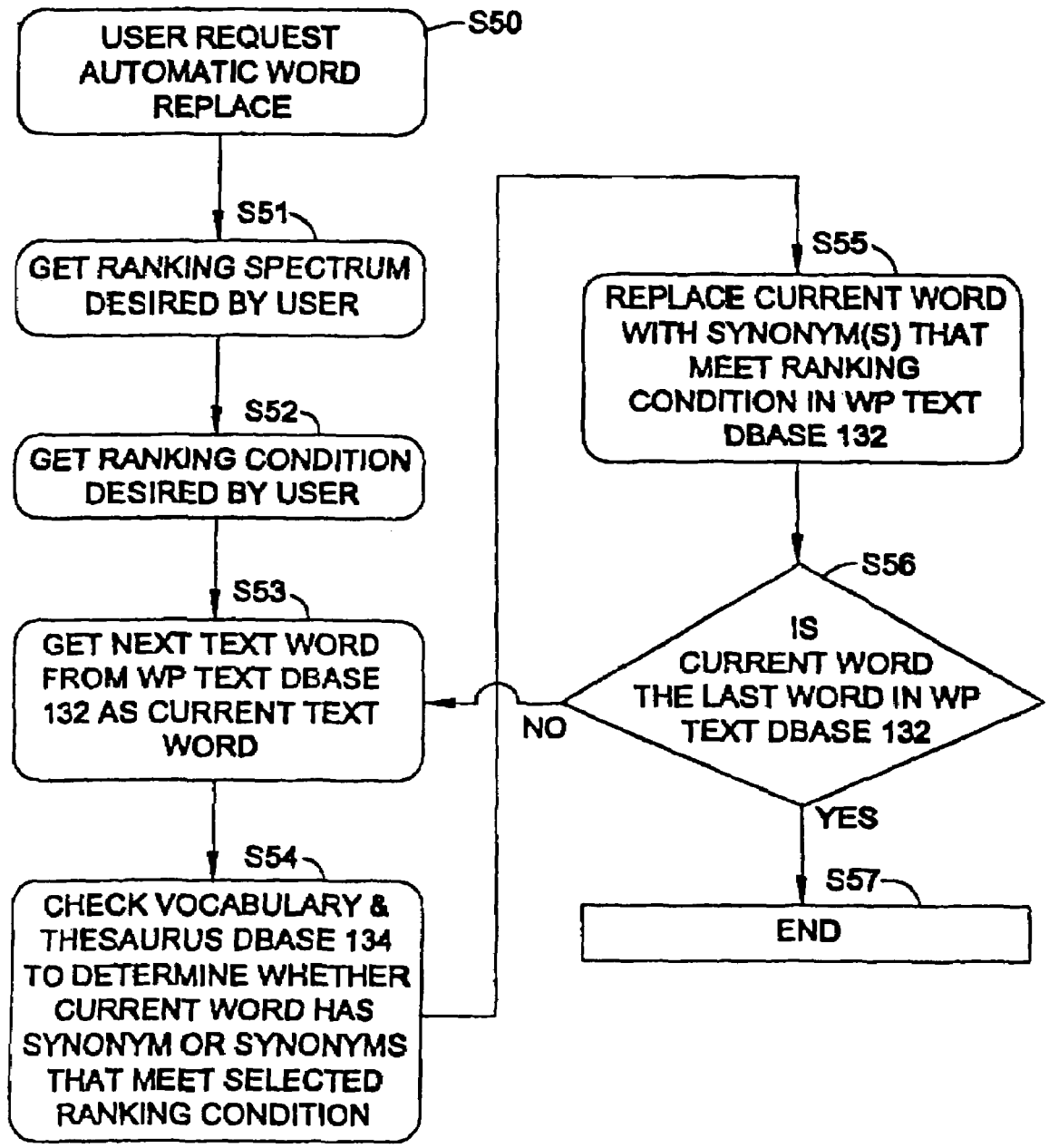
FIG. 10 is a flowchart showing processing that occurs during an automatic word replace process according to the present invention.

At step S50 of FIG. 10, the author activates the automatic word replace function. Processing proceeds to step S51, wherein the author selects the ranking spectrum relevant to the particular search and replace being requested. Let's assume that the particular search and replace requested by the author is being requested in order to refine the reading level. In this case, the relevant ranking spectrum chosen at step S51 would be a ranking spectrum of reading level. Assuming that the vocabulary database of FIG. 4 is what is available to the author, other possible ranking spectrums include happiness, depression, and hostility.

Processing proceeds to step S52 wherein a ranking condition is input by the author. For example, the author may want to use appropriate words of a minimal reading level. As another example of a ranking condition, the author may want words as close to a grade 6 reading level to be substituted throughout the document. As yet another example, the author may want the reading level ranking of all words to be between grade 5 and grade 8.

After the ranking condition is chosen, processing proceeds to step S53 wherein the first text word of WP text database 132 is ascribed as the current text word. Processing them proceeds to step S54 wherein the vocabulary database of FIG. 4 is checked to determine whether the current word has a synonym or synonyms that meet the selected ranking condition. For example, the first word of text shown in display 140 of FIG. 1 is the word "which." As is apparent upon a review of FIG. 4, the word "which" is not present in the vocabulary database of FIG. 4 and is also not present in the thesaurus database of FIG. 5. Therefore, it is determined that the word "which" does not have any appropriate synonym or synonyms at all, let alone appropriate synonym or synonyms that meet the specified ranking condition. When processing proceeds to step S55, no replacement is made because there are no synonyms, and processing then proceeds to S56.

At step S56 it is determined whether the current word is the last word in WP text database 132. In the present example, "which" is not the last word, so processing loops back to step S53. At step S53 the next word from WP text database 132 is ascribed as the current text word. After the processing has proceeded through the loop a couple times for the words that do not have appropriate synonyms listed in the thesaurus database of FIG. 5, the word "merits" will be ascribed as the current text word as step S53.

Once "merits" is ascribed as the current word, processing proceeds to step S54 wherein the vocabulary database of FIG. 4 is consulted to determine that merits does indeed have synonyms in thesaurus group number 2 and also in thesaurus group number 3. Therefore, at step S54, thesaurus group numbers two and three of the thesaurus database of FIG. 5 are consulted to determine what synonyms (if any) have reading level values that are less than the reading level value for the word "merits." As it turns out the synonyms "advantages," "earns," and "suggests" all have a reading level value of grade 3, which is lower than the reading level value of grade 8 for the word "merits."

Processing proceeds to step S55 where the current word "merits" is replaced with the appropriate synonyms and the text. As shown in FIG. 11, the word "merits" has indeed been replaced with all three appropriate synonyms, "advantages," "earns," and "suggests." By displaying all of the potentially appropriate synonyms in this manner, the author can readily choose which synonym should be employed. As shown in FIG. 11, the suggested synonyms "advantages" and "suggest" are not appropriate in context. On the other hand, the synonym "earns" would not substantially change the original contextual meaning of the text. Therefore, the author may choose to use the word "earns," or may alternatively go back to the original word "merits."

After the word "merits" is replaced by its synonym, processing proceeds again to step S56 where it is determined whether the current word "merits" is the last word in WP text database 132. Since it is not the last word, processing continues to loop through steps S53 to S56 for each word of the text. Eventually the word "do" is ascribed as the current word, such that when processing reaches step S56, the word do is recognized as the last word and processing accordingly proceeds from step S56 to an end at step S57.

By comparing the text shown in display 140 of FIG. 11 to the text shown in display 140 of FIG. 1, it will be appreciated that the automatic search-and-replace function replaced the word "consideration" with the word "thought." As it turns out, this replacement works pretty well in context of the textual passage.

In addition to the user-driven text replacements explained in connection with FIG. 6A above and the completely automatic search-and-replace function explained in connection with FIGS. 10 and 11 above, another type of processing is possible that involves an intermediate amount of author involvement. More particularly, a search-and-flag function may be performed. According to a search-and-flag function, processing proceeds through the text on a word-by-word basis, but when a word with more acceptable synonyms is detected, instead of automatically replacing the word, the author can be prompted to look at the word along with all of its ranked synonyms, antonyms, and related words (the prompt would be similar to the thesaurus dialogue window 141 of FIG. 6A). At this prompt, the author could manually select from the wide panoply of synonyms, antonyms and related words. By using such a search-and-flag function, the author does not have to step all the way through the text, but when potentially acceptable replacement words are found, the author may then take control and decide whether any sort of substitution is to be made for each flagged word.

According to some embodiments of the present invention, the program includes a function for monitoring per word threshold valence levels (e.g., +1.2 happiness). When a threshold valence level is crossed (e.g., the overall happiness value exceeds +1.2, or the overall happiness value dips below +1.2), the program automatically flags the author. In operation, a user may click on a "Background Alert" button to activate the function, which assesses that ongoing per word valence levels under each lexical impact and notifies the user if the level in any scale exceeds a threshold. Notifying the author can be achieved graphically or by audio. Advantageously, the background alert function can also identify sequences of valence per scale by partitioning a document by percentage (e.g., first ⅓, second ⅓, last ⅓), then assessing the valences compared to thresholds for each partition. Of course, the document may also be partitioned by paragraph or by using the cursor to highlight individual portions of the text.

The program additionally includes a feature that flags words above or below a predetermined threshold so that a user may more easily adjust content per scale. For example, when attempting to reduce the effect in a particular scale (e.g., hostility), this feature allows the user to easily determine where the high scoring valence words (e.g., +3 hostility or above) are located. This function may be activated by choosing the scale and the threshold value, then clicking on an "Identify Words" button. All such words meeting the chosen criteria are then highlighted, such as by being bolded, underlined, italicized or otherwise made to stand out from the other words.

Figure 12:
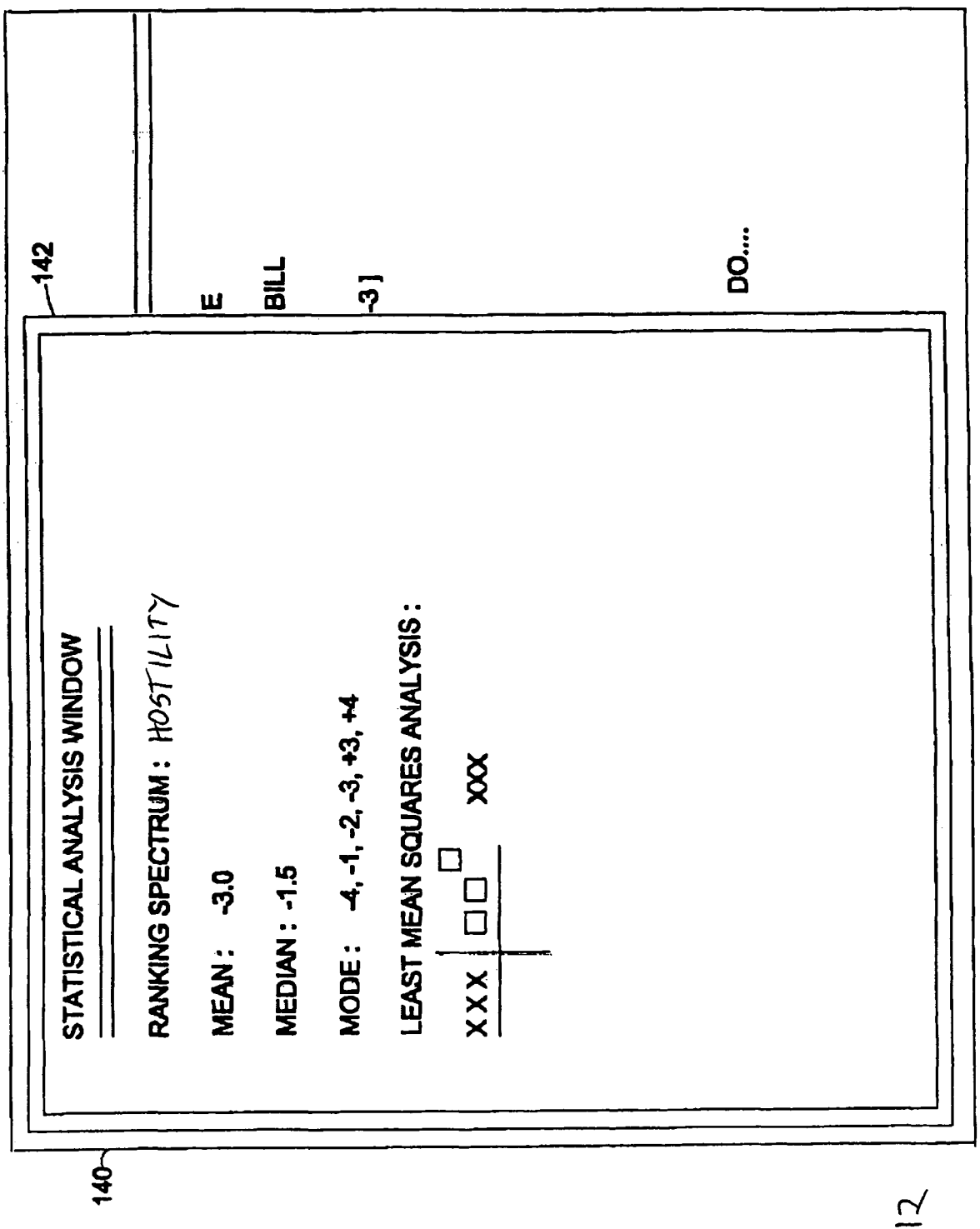
FIG. 12 is an exemplary screen display showing a statistical analysis window according to the present invention.

FIG. 12 shows a display wherein a statistical analysis window 142 has been activated by the author. The statistical analysis window 142 indicates various statistical features based on the rankings of words that are present in the text and also present in the vocabulary database of FIG. 4. This statistical analysis can be especially advantageous with respect to statistical analyses based on lexical impact numbers. For example, in the example of FIG. 12, the statistical analysis is based on the lexical impact of hostility. Using the lexical impact values for hostility (shown in display 140 of FIG. 1), various averaging statistics have been determined. These averaging statistics include a mean, a median and a mode. Other averaging statistics are possible. Also, some least mean squares analysis is provided in statistical analysis window 142.

All kinds of statistics and models are possible, such as regressions, variances, standard deviations and the like. These statistics are utilized to help the author evaluate the overall lexical impact (in this case the lexical impact of hostility) of a piece of text. Perhaps because these kinds of statistical analyses have been difficult or impossible to perform in the past, it is not known exactly how these various statistics should be used in revising the text. However, now that the present invention makes these statistics easy to determine, it will become much easier to set down rules for optimizing lexical impact based on relevant statistics.

Many variations on the above-described lexical impact computer programs and ranked thesauruses are possible. Such variations are not to be regarded as a departure from the spirit and scope of the invention, but rather as modifications intended to be encompassed within the scope of the following claims, to the fullest extent allowed by applicable law.

What is claimed is:

1. A computer program stored on a computer readable memory comprising:
   a vocabulary database comprising machine readable data corresponding to a plurality of vocabulary words and a lexical impact value respectively corresponding to each vocabulary word for a chosen lexical impact scale;
   comparison instructions comprising machine readable instructions for comparing a plurality of text words of a writing to the vocabulary database to determine lexical impact values for the chosen lexical impact scale for each text word that corresponds to a vocabulary word; and
   output instructions comprising machine readable instructions for outputting the lexical impact value of the text words for the chosen lexical impact scale that correspond to vocabulary words as output data for users to make text word selections or assess the lexical impact values of words;
   wherein the lexical impact is determined independently of a denotative meaning of the word and independently of a contextual meaning of the word.

2. The computer program of claim 1, wherein the output instructions further comprise machine readable instructions for outputting an overall lexical impact value of the text words in the writing for the chosen lexical impact scale.

3. The computer program of claim 2, wherein the overall lexical impact value is the average lexical impact value of the text words for the chosen lexical impact scale.

4. The computer program of claim 3, wherein the average lexical impact value is a per word value averaged over the entire writing.

5. The computer program of claim 4, further comprising comparison instructions including machine readable instructions for comparing the average lexical impact value for the chosen lexical impact scale to a predetermined lexical impact threshold value.

6. The computer program of claim 5, further comprising display instructions including machine readable instructions for generating a visual display, perceivable by the author, indicative of exceeding the predetermined lexical impact threshold value.

7. The computer program of claim 3, wherein the average lexical impact value is a per word value averaged over a portion of the writing.

8. The computer program of claim 3, further comprising comparison instructions including machine readable instructions for comparing the average lexical impact value for the chosen lexical impact scale to a predetermined lexical impact threshold value.

9. The computer program of claim 8, further comprising display instructions including machine readable instructions for generating a visual display, perceivable by the author, indicative of exceeding a predetermined lexical impact average threshold value.

10. The computer program of claim 1, further comprising display instructions including machine readable instructions for generating a visual display, perceivable by the author, corresponding to each individual word that exceeds a predetermined lexical impact threshold value.

11. The computer program of claim 10, wherein each word that exceeds the predetermined lexical impact threshold value is highlighted within the writing.

12. The computer program of claim 11, wherein the words are highlighted by a variation in the color of the text words.

13. The computer program of claim 11, wherein the words are highlighted by a variation in the color of the background of the text.

14. The computer program of claim 1, wherein the computer program is configured to operate over a website interface.

15. A computer program stored on a computer readable memory comprising:
    a thesaurus database comprising machine readable data corresponding to thesaurus groupings and rankings for each thesaurus grouping, with respect to a plurality of lexical impact scales;
    input instructions comprising machine readable instructions for receiving a requested text portion for a chosen lexical impact scale;
    retrieval instructions comprising machine readable instructions for retrieving a thesaurus grouping corresponding to the requested text portion; and
    output instructions comprising machine readable instructions for outputting the thesaurus grouping including potential replacement words and corresponding rankings for users to make text word selections or assess the lexical impact values of words;
    wherein the lexical impact is determined independently of a denotative meaning of the word and independently of a contextual meaning of the word.

16. The computer program of claim 15, wherein the thesaurus grouping only includes potential replacement words from the chosen lexical impact scale.

17. The computer program of claim 16, wherein the thesaurus grouping only includes potential replacement words that have a positive valence with respect to the chosen lexical impact scale.

18. The computer program of claim 16, wherein the thesaurus grouping includes zero valence substitutions.

19. The computer program of claim 15, wherein the thesaurus grouping includes out-of-scale substitutions.

20. The computer program of claim 15, wherein the potential replacements are sorted by valence.

21. The computer program of claim 20, wherein the potential replacements are also sorted alphabetically.

22. The computer program of claim 15, wherein the thesaurus database further comprises machine readable data corresponding to homonym groupings and aural impact rankings for each homonym grouping.

23. The computer program of claim 22, wherein each word that includes undesirable aural effects is highlighted within the writing.

24. The computer program of claim 23, wherein the words are highlighted by a variation in the color of the text words.

* * * * *